(12) United States Patent  
Greenwald et al.

(10) Patent No.: US 7,896,202 B2  
(45) Date of Patent: Mar. 1, 2011

(54) DISPOSABLE INTEGRATED BAG AND PUMP

(76) Inventors: Shlomo Greenwald, Ithaca, NY (US); Zipora Greenwald, Ithaca, NY (US)

( * ) Notice: Subject to any disclaimer, the term of this patent is extended or adjusted under 35 U.S.C. 154(b) by 57 days.

(21) Appl. No.: 12/497,063

(22) Filed: Jul. 2, 2009

(65) Prior Publication Data

US 2009/0266849 A1  Oct. 29, 2009

Related U.S. Application Data

(63) Continuation-in-part of application No. 11/209,016, filed on Aug. 22, 2005, now Pat. No. 7,578,419.

(60) Provisional application No. 60/642,311, filed on Jan. 7, 2005, provisional application No. 60/682,107, filed on May 18, 2005, provisional application No. 60/700,824, filed on Jul. 20, 2005.

(51) Int. Cl.  
*B65D 88/54* (2006.01)

(52) U.S. Cl. ......... 222/333; 222/380; 222/504; 222/571; 417/417; 417/44.1

(58) Field of Classification Search .................. 222/333, 222/380, 504, 571; 417/44.1, 417  
See application file for complete search history.

(56) References Cited

U.S. PATENT DOCUMENTS

| 2,254,833 | A |   | 9/1941 | Ashkenaz |
| 2,554,570 | A | * | 5/1951 | Harvey ........................ 222/207 |
| 2,740,553 | A | * | 4/1956 | Maynard ........................... 222/2 |
| 2,849,159 | A |   | 8/1958 | Kauffmann |
| 2,887,255 | A |   | 5/1959 | Baurlein |
| 2,979,231 | A |   | 4/1961 | Witherspoon, Jr. |
| 3,136,257 | A | * | 6/1964 | Smith et al. .................... 417/241 |
| 3,258,166 | A |   | 6/1966 | Kuckens |
| 3,386,622 | A |   | 6/1968 | Cox |
| 3,521,794 | A |   | 7/1970 | Bijl |
| 3,606,595 | A |   | 9/1971 | Takamizawa |
| 3,828,985 | A |   | 8/1974 | Schindler |
| 3,893,594 | A |   | 7/1975 | Carbine |
| 4,102,610 | A |   | 7/1978 | Taboada et al. |
| 4,334,640 | A |   | 6/1982 | van Overbruggen |
| 4,352,645 | A |   | 10/1982 | Meyer |
| 4,356,937 | A |   | 11/1982 | Simon et al. |
| 4,393,982 | A |   | 7/1983 | Kuckens |
| 4,450,987 | A |   | 5/1984 | Boettcher |
| 4,496,292 | A |   | 1/1985 | Panick et al. |
| 4,515,294 | A |   | 5/1985 | Udall |
| 4,518,105 | A | * | 5/1985 | Kuckens et al. ............... 222/207 |
| 4,598,845 | A | * | 7/1986 | Ozdemir ........................ 222/449 |
| 4,624,395 | A |   | 11/1986 | Baron et al. |

(Continued)

*Primary Examiner* — Kevin P Shaver  
*Assistant Examiner* — Andrew Bainbridge  
(74) *Attorney, Agent, or Firm* — Brown & Michaels, PC

(57) ABSTRACT

A disposable pump for a collapsible reservoir has an upper chamber, a lower chamber and a seal base in between. The upper and lower chambers have flexible sections or bellows that expand or contract the chambers, and the seal base has a rigid rod that selectively forms a seal on an opening in the seal base between the upper and lower chambers. One of the two chambers has a nozzle and the other chamber has a top cap that leads in many embodiments to a collapsible bag reservoir. In at least one embodiment a solenoid overcomes the biasing force of a compression spring and lifts the seal base off the rigid rod. This opens the seal and assisting pushing out potentially very viscous liquids into the chamber that includes the nozzle and the liquid ultimately dispenses from the pump through the nozzle.

12 Claims, 12 Drawing Sheets

U.S. PATENT DOCUMENTS

| | | | |
|---|---|---|---|
| 4,708,266 A | 11/1987 | Rudick | |
| 4,722,372 A | 2/1988 | Hoffman et al. | |
| 4,735,345 A | 4/1988 | Lee | |
| 4,775,301 A | 10/1988 | Cartwright et al. | |
| 4,909,712 A | 3/1990 | Mortensen | |
| 4,921,131 A | 5/1990 | Binderbauer et al. | |
| 5,114,047 A | 5/1992 | Baron et al. | |
| 5,275,309 A | 1/1994 | Baron et al. | |
| 5,405,050 A | 4/1995 | Walsh | |
| 5,567,131 A * | 10/1996 | McNaull | 417/417 |
| 5,615,801 A | 4/1997 | Schroeder et al. | |
| 5,842,603 A | 12/1998 | Schroeder et al. | |
| 5,915,930 A * | 6/1999 | McNaull | 417/417 |
| 6,257,445 B1 * | 7/2001 | Means et al. | 222/1 |
| 6,343,724 B1 | 2/2002 | Ophardt et al. | |
| 6,398,081 B2 | 6/2002 | Bassi et al. | |
| 7,093,774 B2 | 8/2006 | Martin | |
| 7,578,419 B2 * | 8/2009 | Greenwald et al. | 222/333 |
| 2002/0148529 A1 | 10/2002 | Berndorfer et al. | |

* cited by examiner

DISPOSABLE INTEGRATED BAG AND PUMP

REFERENCE TO RELATED APPLICATIONS

This application is a continuation-in-part of application Ser. No. 11/209,016, filed Aug. 22, 2005 and entitled "Disposable Integrated Bag and Pump". now issued as U.S. Pat. No. 7,578,419, which claimed the benefit under 35 USC §19(e) of U.S. Provisional Applications No. 60/642,311, filed Jan. 7, 2005, entitled "Beverage Dispenser with Disposable Pump", No. 60/682,107, filed May 18, 2005, entitled "Plastic Pump for Beverage and Soap Dispensing", and No. 60/700,824, filed Jul. 20, 2005, entitled "Super Quiet Disposable Pump". The aforementioned applications are hereby incorporated herein by reference.

BACKGROUND OF THE INVENTION

1. Field of the Invention

The invention pertains to the field of reservoirs and pumps for dispensing liquids. More particularly, the invention pertains to positive-displacement pumps which are integrated into liquid reservoirs.

2. Description of Related Art

In all beverage dispensers using liquid concentrate, from which beverages are extracted by hot or cold water, the dispensing of the concentrate liquid is done by a "pump". The most common is a peristaltic pump. The pump is part of the dispenser and the concentrate liquid bag is connected to the pump on one side and the mixing water on the other side via special plastic tubing.

In order to ensure a high quality beverage dispenser it is essential to clean and sanitize especially the concentrate liquid dispensing system periodically to avoid the growth of bacteria which might be harmful to the customers and degrade the quality of the dispensed beverage. In the current liquid concentrate beverage dispensers, the cleaning procedure is labor intensive and requires basic technical skills that in most cases the service personnel do not have. Therefore the cleaning and sanitize procedure is done very rarely.

A second important requirement of a beverage dispenser which uses concentrate liquid is to achieve consistency in the mixing ratio for each cup. This requires concentrate liquid dispensing pump that will be able to change the dispensing rate of the concentrate liquid instantly and with very fine resolution on order of 1% or better. Such a pump is relatively expensive and requires sophisticate controller. Also it is desired to have a pump with large dynamical range.

It is known to the art to use collapsible reservoirs made of plastic bags, usually packaged in a rigid outside container such as a corrugated cardboard box, to hold and dispense various liquids. Such reservoir systems are called "bag-in-box" packaging. Originally developed as disposable containers for battery acid, today they are commonly used for liquid concentrate for beverage dispensers such as liquid concentrate coffee for coffee machines, beverage syrup for soda fountain carbonated drink dispensers, concentrate for coin-operated soda machines, etc. For example, see U.S. Pat. No. 4,356,937 "Syrup Distributing System" for a bag-in-box syrup system for beverage dispensers.

The bag-in-box reservoir is also known for dispensing various non-food liquids such as hand soap in rest room soap dispensers, photographic chemicals, liquid toner for copiers, printing ink and colorant, liquid detergent for commercial dishwashers, etc. Most often, bag-in-box reservoirs are fitted with simple spouts or valves or quick-disconnect fittings for providing a connection to the bag and sealing the opening when the bag is not in use.

The bag-in-box reservoir system allows the reservoir (bag) to collapse within the container (box) as the liquid is withdrawn. Thus, no provision needs to be made for allowing air into the reservoir to break a vacuum, as would be required for rigid-reservoir systems. This means that the liquid in the bag remains unaffected by outside air until the liquid is dispensed, providing a longer life and fresher product, in the case of food concentrates.

It is known to include a pump or valve as part of a removable fluid reservoir in a dispensing system. These pumps are often incorporated into the reservoir structure, or built into a spout, dispensing tube or cap for the reservoir. In some cases, the pumps are designed to be disposable or recyclable with the reservoir. Some examples are shown in the following US patents:

U.S. Pat. No. 2,254,833 "Method and Apparatus for Controlling Intermittent Fluid Flow" (1941) shows a solenoid-actuated valve in a hospital intranasal feeding system. A solenoid coil surrounds the tube leading from the drip bottle, and valve is formed by a metallic member in the tube. The metallic member is reciprocated by electrical pulses in the coil, releasing quantities of liquid when the solenoid is actuated.

U.S. Pat. No. 2,887,255 "Liquid Measuring Device" (1959) is a washing-machine detergent dispenser. A solenoid coil surrounds an armature in a chamber, all formed into cap of detergent bottle. Detergent fills the chamber when the solenoid is inactive, allowing the armature to block the outflow from the chamber. When the coil is actuated, the armature moves up, blocking detergent flow into the chamber, and allowing the chamber to drain, dispensing a measured portion of detergent.

U.S. Pat. No. 3,258,166 "Dispenser for Liquids" (1966) shows a valve within an elongated spout of a jar for a liquid dispenser. A coil surrounds the spout and reciprocates the valve: ". . . while it oscillates the armature acts not unlike the plunger of a pump and actually forces the liquid through the nipple . . . is of particular advantage when the liquid is coffee extract . . ." If this design were used in a bag-in-box application, air can enter from the bottom of the spout when the valve is up—vents are provided in the rigid jar used in this patent which are not available in the bag-in-box. Also, this design relies on the liquid height in the vented jar to return the valve to its seat, so that the amount of liquid dispensed would vary depending on the amount of liquid in the reservoir, which would make it difficult to dispense consistent amounts of liquid.

U.S. Pat. No. 4,393,982 "Metered Dispensing of Liquids" (1983) uses a coil surrounding a dispensing tube. A disk-like armature is attracted by the coil to compress a bellows in the tube to pump liquid. This design requires one-way valves above and below the bellows, which can become clogged, especially with more viscous liquids like concentrated beverages or soap.

U.S. Pat. No. 4,450,987 "Portion Control Liquid Dispenser" (1984) uses a solenoid coil surrounding a valve armature in a tube from a bag-in-box. The armature is purely a valve, and liquid runs out of the bag by gravity when the valve is open, it is not pumped. This is similar to U.S. Pat. No. 4,921,131 "Liquid Dispenser" (1990), which is a soap dispenser which also uses a solenoid coil to operate an armature acting as a valve in the bag tube.

U.S. Pat. No. 5,114,047 "Pump and Mixing Device for Liquids" (1992) is part of a juice dispensing system in which a plastic reservoir for juice concentrate is sold with an integrated disposable pump. A single compressible chamber acts as a pump, compressed by a lever arm leading from a motor. The pump design of this patent requires one-way valves, with the disadvantages explained previously. A continuation-in-part, U.S. Pat. No. 5,275,309 "One Way Valve with Unitary Valve Element" (1994) shows details of a number of embodiments of these valves.

U.S. Pat. No. 5,615,801 "Juice Concentrate Package for Postmix Dispenser" (1997) is another example of a disposable pump which is part of a bag-in-box system. The pump is a "Progressive Cavity" pump.

SUMMARY OF THE INVENTION

In order to eliminate the need of cleaning and sanitizing of the concentrate liquid dispensing system, increase its reliability, improve the consistency, simplify the dispenser design, and lower manufacturing cost, the invention provides an innovative disposable concentrate pump where the small pump body is part of the concentrated liquid collapsible bag, and the actuating solenoid is mounted in the dispenser.

When a new concentrate bag is loaded, the attached pump body is inserted into the solenoid. When the bag is empty the in-bag part of the pump will be disposed of, along with the empty bag. To make the system economically feasible, it is desirable that the disposable part of the pump cost only a small fraction of the cost of the concentrate liquid in the bag, and the innovative pump design of the invention will enable us to achieve this important requirement.

The Integrated Disposable Bag Pump dispensing system can be used not only in beverage dispensing but also in chemical or manufacturing processes where a very accurate fluid mixing is required.

Three different pump embodiments will be described in detail below.

DETAILED DESCRIPTION OF THE INVENTION

Figure 1:
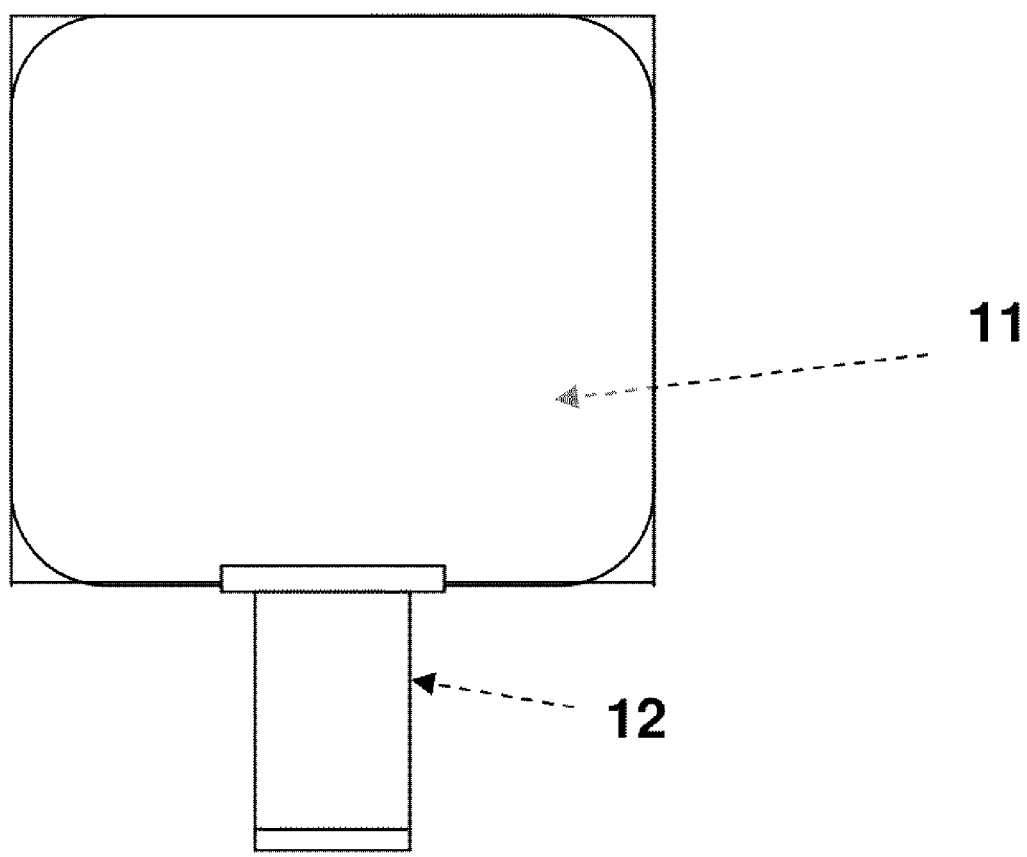
FIG. 1 shows a schematic representation of the disposable integrated bag pump unit of the invention

In the following we will describe the three different embodiments of disposable pump 12 which is connected to a collapsible bag 11 to form an Integrated Disposable Bag Pump (IDBP) as can be seen in FIG. 1. The first embodiment is an innovative new Super Quiet Disposable Pump (SQDP) where the pump can be part of a disposable integrated collapsible bag and pump. One of the applications of the Integrated Disposable Bag Pump is in beverage dispensers, using concentrate liquid in a collapsible bag, where the users have a direct interaction with the dispenser. In these cases it is very desirable that the pump operation will be very quiet and not generate noise which might be unpleased and annoying to the users.

The major advantages of the Integrated Bag Pump are:
Simplify concentrate liquid bag replacement procedure.
Ease of interchanging different flavors of concentrated liquid, with no need to pre-wash the dispensing system.
Prevent possible air contamination during bag replacement since when using the Integrated Disposable Bag Pump the bag content is never exposed to air, which would deteriorate the quality of the beverage.
Eliminate the need of cleaning of the concentrated liquid dispensing system, which in current dispensers is a tedious and time consuming procedure.
Compactness in size.
Simplify the design of the dispenser
Lower the cost of manufacture of the dispenser.
The wide range of dispensing rate per unit time enables the same dispenser to operate with a wide range of concentrate liquid strengths. The same concentrate liquid dispensing system can be used for both a high mixing ratio product and low mixing ratio product.
Readily changeable mixing ratio of the dispensed beverage to satisfy customer preference.

Figure 2A:
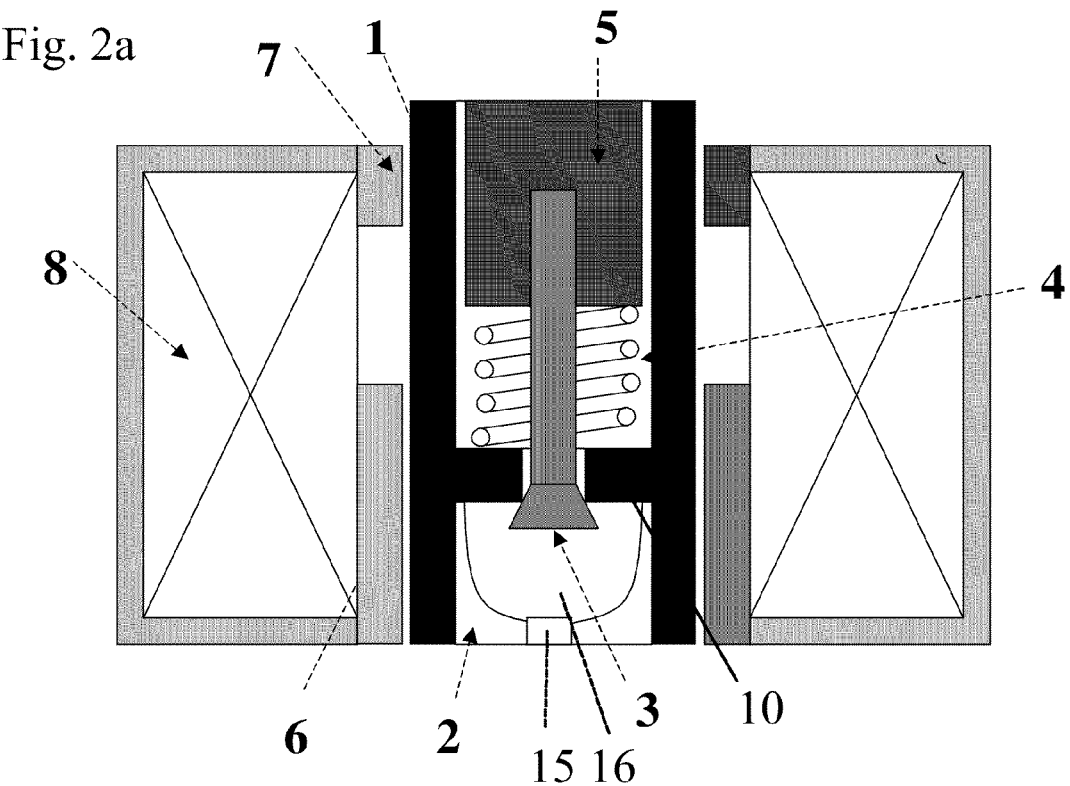
FIGS. 2a and 2b show a cross section of the Super Quiet Disposable Pump embodiment of the invention, assembled in the actuating solenoid.
Figure 2B:
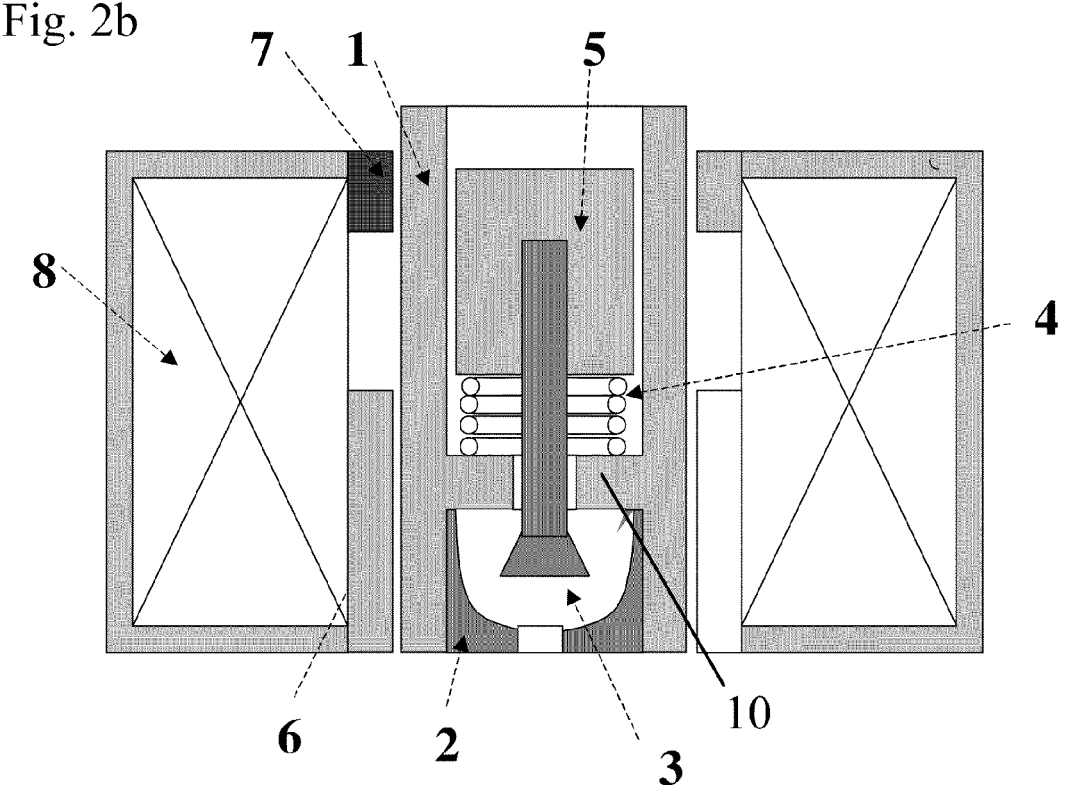

A cross section of the Super Quiet Disposable Pump (SQDP) assembled in the actuating solenoid can be seen in FIGS. 2a and 2b.

The pump is constructed from five parts: a Pump body 1, nozzle 2 and seal-head 3, all made of molded plastic, and a non-magnetic compression spring 4 made of metal such as Stainless Steel, and Plunger 5 made of a ferromagnetic metal such as Stainless Steel 440C. The actuating solenoid has three parts: Pole-Piece 6 and Magnetic flux focusing ring 7, both made of a ferromagnetic metal like the Stainless Steel. 440C, and solenoid coil 8.

In the design of the SQDP, as can be seen in FIGS. 2a and 2b, the only moving metal part in the pump is the plunger 5, while the second part of the magnetic circuit, the pole-piece 6 is located outside the pump and is part of the actuating solenoid. This design allows the pump to operate without generating noise as will be described below. In addition, it simplifies the manufacturing and assembly which will lower the cost in commercial mass production.

Figure 4:
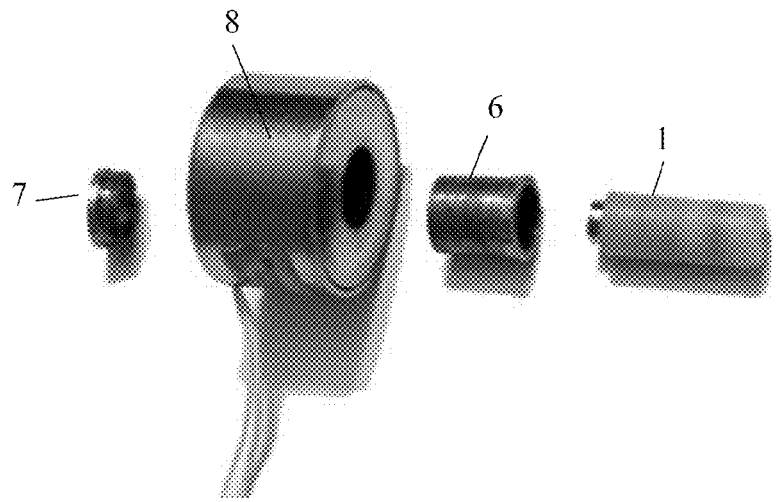
FIG. 4 shows an exploded view of the pump of the invention.
Figure 5:
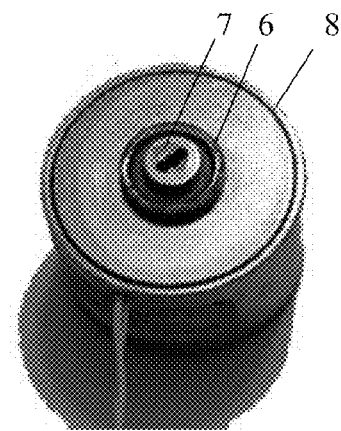
FIG. 5 shows a top view of the pump assembled in the solenoid.
Figure 6:
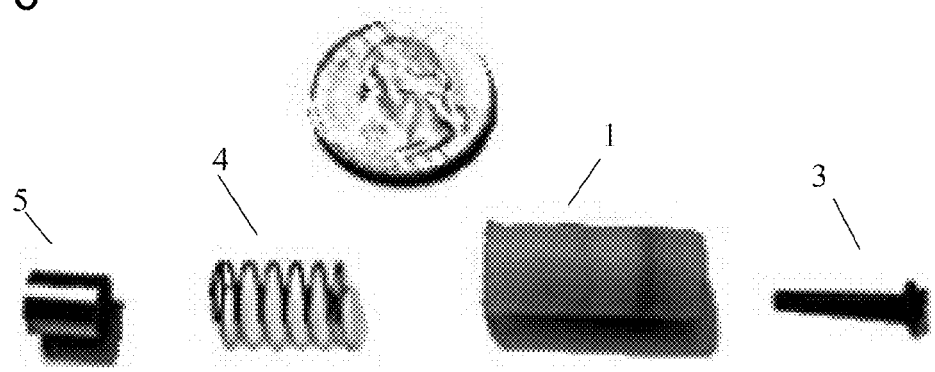
FIG. 6 shows an exploded view of the pump parts.

FIG. 4 shows, from left to right, the magnetic flux focusing ring 7, the solenoid coil 8, the pole piece 6, and the assembled pump. FIG. 6 shows an exploded view of the pump parts, from left to right, the plunger 5, compression spring 4, pump body 1, and seal-head 3.

In the magnetic actuator circuit the plunger 5 (the moving part) is facing the pole-piece 6 (the stationary part) and is separated from it by a short distance (gap) which will determine the total travel distance of the plunger when the magnetic actuator is actuated.

In this configuration the pulling force acting on the plunger due to the magnetic field vector is perpendicular to the surface of the plunger. The force intensity is proportional to one over the gap squared. In prior art pumps, as the plunger is accelerated and the gap becomes smaller the pulling force intensity is increasing very rapidly and the velocity and momentum of the plunger is increasing accordingly. Therefore, in order to stop the plunger a hard surface has to be introduced in its path. This usually is the pole piece surface. When the plunger hits the pole piece it reaches its maximum velocity and maximum momentum and a noise is generated.

Figure 3:
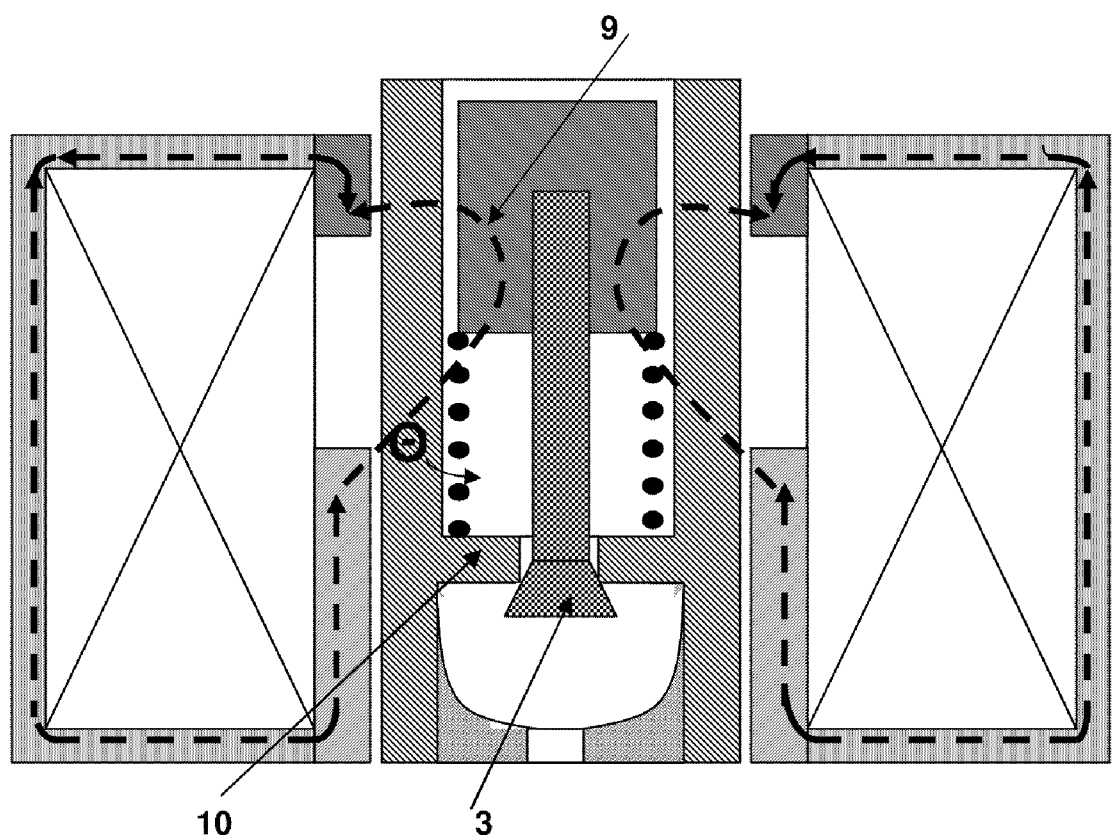
FIG. 3 shows the view of FIG. 2, with a magnetic flux line added.

In our innovative design of the SQDP pump, with the pole piece 6 located outside the pump, the magnetic flux 9 generated by the solenoid is not perpendicular to the surface of the plunger 5 but it intersects the plunger at an angle $\Theta$ as can be seen in FIG. 3. Therefore the magnetic field vector has two components: a first component in the longitudinal direction $H_z$, and a second component in the radial direction $H_r$. The longitudinal magnetic field component, $H_z$, which is proportional to $\cos(\Theta)$, is the one which pulls the plunger 5 down to decrease the distance between the plunger 5 and the pole piece 6. As the plunger 5 is moving down towards the pole piece 6 the intersection angle, $\Theta$, of the magnetic flux 9 with the plunger 5 is increasing and the pulling force due to the longitudinal magnetic field $H_z$, which is proportional to $\cos(\Theta)$, is decreasing. As the plunger 5 is moving down the angle $\Theta$ is increasing and when its value is approaching ninety degrees, the pulling force on the plunger 5 becomes very small. On the other hand, the restoring force due to the spring 4, $F_s$, which is proportional to the plunger 5 displacement, is increasing. Because $F_s = K\Delta Z$ where K is the spring 4 constant and $\Delta Z$ is the amount of the spring compression by the plunger moving down, when the restoring force of the compression spring 4 becomes larger then the pulling force due to the magnetic field $H_z$ the plunger 5 movement will be slowed down to zero (FIG. 2b). Since the plunger 5 velocity is brought to zero without hitting the pole piece 6 or any other solid surface it does not generate any noise.

At this point the plunger 5 will reverse its motion and will be pushed upwards by the compression spring 4. If the current pulse width provided to the solenoid 8 is shorter then the time it takes to bring the plunger 5 velocity to zero, the plunger 5 will be pushed back all the way to its starting position by the compression spring 4. But if the current pulse width provided to solenoid 8 is longer, then plunger 5 will move down until the compression spring 4 is completely compressed as can be seen in FIG. 2b and it will be held in this position by the solenoid magnetic field. In this case the fully compressed spring 4 and the plunger 5 pressing on top of it will prevent the liquid from flowing out.

The plunger 5, rigidly connected to the seal-head 3, is pushed back to its starting position (FIG. 2a) by the compression spring 4 and will be stopped when the seal-head 3 hits the seal-base 10. Since the seal-base 10, which is part of the pump body 1, is made of plastic and since the seal-head 3 is also made of plastic, and in addition they touch each other only at a very small cross section, as can be seen in FIG. 2a, the noise generated by the impact of the seal-head 3 on the seal-base 10 is very low. Also the noise generated by the impact of two plastic bodies has relatively lower frequency components then the noise generated by the impact of two metallic bodies. Therefore it will be damped more strongly by the liquid in the pump.

SQDP Design Considerations a. The operating pulse voltage width ("ON" time) to the pump solenoid 8 has to be shorter then the time it takes to bring the plunger 5 velocity on its way down to zero. This is required to insure that the plunger 5 will not start to oscillate.

b. At maximum operating rate of strokes/sec. the time duration of the "OFF" time has to be long enough to allow the plunger 5 to reach its starting position. Otherwise, the dispensing rate per stroke will not be the same when operating the pump at maximum frequency of strokes/sec as when the pump is operating at lower frequency of strokes/sec.

c. The total numbers of coils in the compression spring 4 has to be such that when the plunger 5 begins to move upward the coils do not touch each other and the gap between each coil is large enough to allow the liquid to flow in, since no vacuum can be generated in the space under the plunger enclosed by the spring. This is required to make sure that the plunger 5 will be pushed back by the compression spring 4 at minimum time.

Pump Operation

The seal head 3 which is rigidly connected to the plunger 5 is pulled by the compression spring 4 into the seal base 10 opening and seals the bag 11. When the solenoid 8 is actuated by a short voltage pulse, of the order of few milliseconds, the plunger 5 is pulled down and;

A) The seal head 3, which is rigidly connected to the plunger 5, will move away from the seal base 10 and open the seal.

B) The moving plunger 5 increases the pressure of the fluid that is located between the plunger 5 and the seal base 10. Since fluid is incompressible it will be forced by the moving down plunger 5 to flow out through the open seal and the small opening in the nozzle 2 and some of it will flow back to the top of the plunger 5 through the gap between the plunger 5 and the pump body 1.

C) Since vacuum can not be generated above the moving down plunger 5 the volume above the plunger 5 that is equal to the fluid that was pushed out by the plunger 5 will be refilled by suctioning liquid from the collapsible bag 11.

This process (dispense phase) continues until the velocity of the plunger 5 will be slowed to zero by the compression spring 4. At this moment the plunger will reverse its motion and will be pushed upward by the compressed spring 4 and;

D) The seal head 3, which is rigidly connected to the plunger 5, will move upward and because of its cone shape it will start to narrow the opening in the seal base 10.

E) The upward moving plunger 5 increases the pressure of the fluid that is located between the top of the plunger 5 and the bag 11. Since fluid is incompressible it will be forced by the upward moving plunger 5 to flow downward into the empty spaced left behind by the upward moving plunger 5. This process (filling phase) continue until the seal head 3 hit the seal base 10.

As the plunger 5 is moving upward to it starting position the seal head 3 is moving with it deeper into the opening in the seal base 10 and the gap between the cone shape seal head 3 and the outer rim of the opening in the seal base 10 become smaller and smaller. Since during the filling phase the pressure of the liquid in the volume under the plunger 5 is equal to the pressure of the liquid in the nozzle 2 so there is no extra pressure to force the liquid out through the nozzle 2, and the opening in the seal base 10 becomes smaller and smaller as the plunger is moving upward, very little liquid (if any) flows out during the filling phase.

If the time interval between two successive strokes is larger then the time it takes compression spring 4 to push plunger 5 all the way to its starting position, the liquid dispensed in each stroke will the same, independent on the number of strokes per second.

Empty Bag Indicator

As was explained above, the noise that is generated by the impact of the plastic seal-head 3 with the plastic seal-base 10 is strongly damped by the liquid in the pump. On the other hand when there is no liquid in the pump this noise is not damped and a low level noise can be heard. This effect can be used to indicate when the liquid in the collapsible bag attached to the pump is running out of liquid. The low level noise generated by the pump when the pump is running dry can be picked up by a simple acoustic sensor and used to stop the dispensing and indicate to the user that the collapsible bag is empty.

Second Embodiment

Figure 7A:
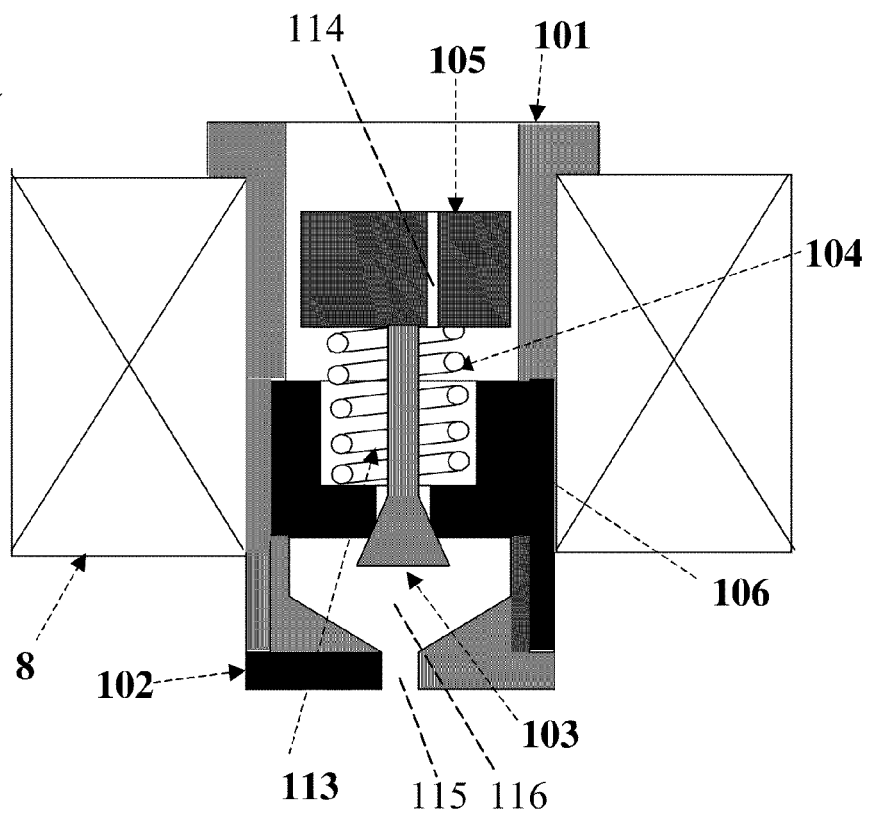
FIGS. 7a and 7b show a cross section of a second embodiment of the invention, in which the pole piece is in the pump body.
Figure 7B:
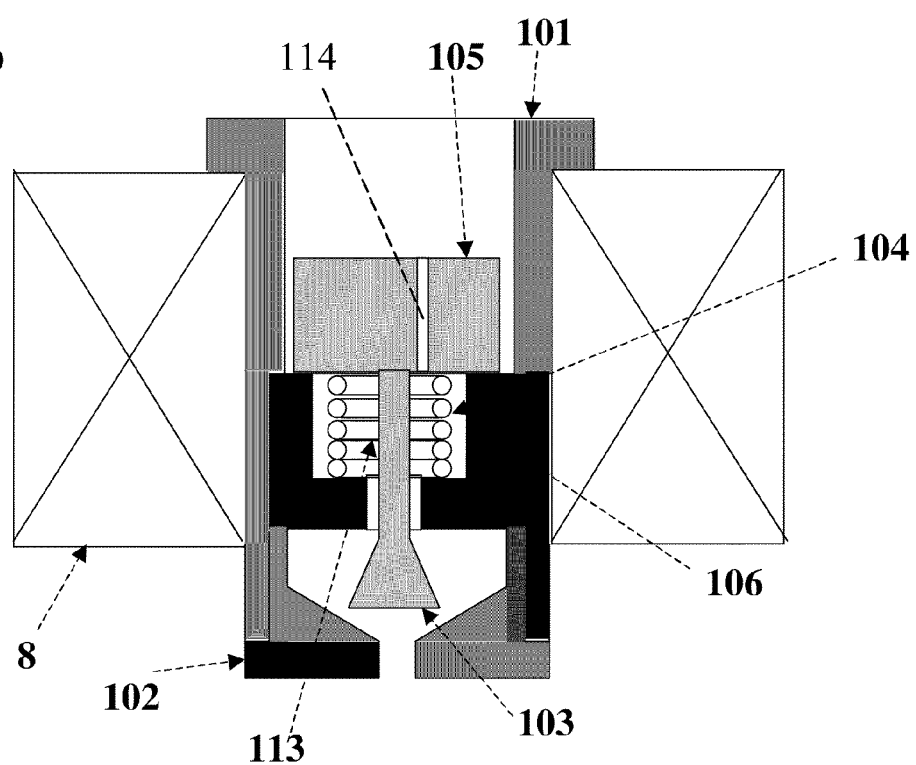

The second embodiment of the disposable pump can be seen in FIGS. 7a and 7b, with FIG. 7a showing the position of the pump with the coil 8 inactivated, and FIG. 7b showing the position of the pump with the solenoid coil 8 activated. One major difference between the second embodiment and the first embodiment of the SQDP described above, is that in the second embodiment the pole piece 106 is placed inside the pump body 101. The seal head 103 is connected rigidly to the plunger 105 similar to the SQDP. In this configuration when the solenoid is actuated the magnetic flux is always perpendicular to the plunger 105 and the pulling force intensity due to the magnetic field $H_z$ is proportional to one over the distance between the plunger 105 and the pole piece 106 square. As the plunger 105 is accelerating and the gap between the plunger 105 and the pole piece 106 becomes smaller the pulling force intensity is increasing very rapidly and the velocity and momentum of the plunger is also increasing accordingly until the plunger 105 hits the pole piece 106 as can be seen in FIG. 7b.

In order to avoid "hang-up" and allow the compression spring 104 to push the plunger 105 upward immediately after it reaches the pole piece 106 and it seals the compression spring 104 cavity 113 inside the pole piece 106, a narrow passage 114 is provided through the plunger 105 for the liquid to flow into the compression spring 106 cavity 118, to fill the empty space that is left behind when the plunger 105 is in its initial state of moving upward. This is accomplished by machining, close to the center, a small diameter vertical hole 114 through the plunger 105 as can be seen in FIG. 7a. Later on the liquid flows in through the opening between the plunger 105 and the pump inner wall.

If the current pulse width provided to solenoid coil 8 is long, after the plunger 105 reaches the pole piece 106 and seals the compression spring 104 cavity 118, it will be held in this position by the solenoid 8 magnetic field as can be seen in FIG. 7b. Therefore the liquid will not be able to flow out. The principle of operation of this embodiment is similar to the one described above for the first embodiment SQDP.

The super quiet pump of FIGS. 2a and 2b and the second embodiment pump shown in FIGS. 7a and 7b both have a nozzle part 2 and 102 at the output. The nozzle has a small chamber 16 and 116 with an output hole 15 and 115. The nozzle chamber serves to prevent air from entering the pump.

When the pump is at the end of the dispense cycle (the plunger reached the pole piece as in FIG. 7b or 2b) the nozzle chamber 116 is full of liquid and acts as a barrier that will not allow air to enter the pump when the plunger is moving up. Since the output hole 115 in the nozzle is relatively small the liquid will not readily flow out from the nozzle chamber. A pump without the nozzle chamber was tested, and some air was able to enter into the pump. When the nozzle chamber was added, with a relatively small exit hole, no air entered the pump.

Third Embodiment

Figure 8:
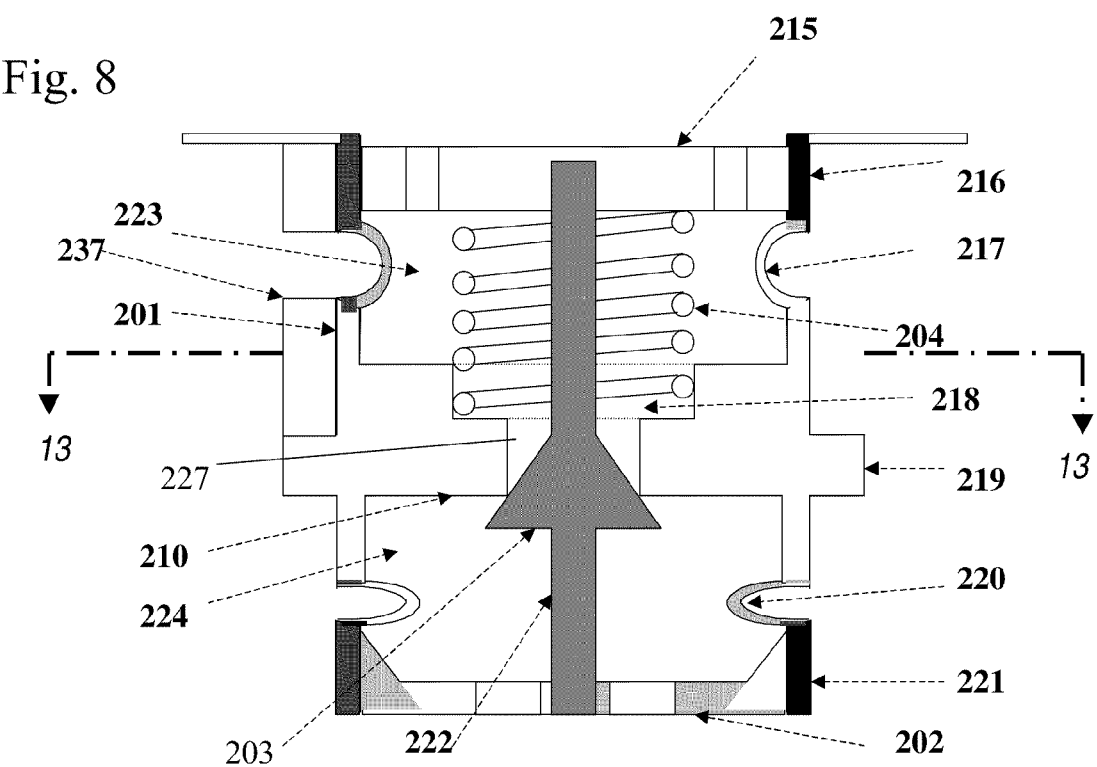
FIG. 8 shows a cross section of a third all plastic embodiment of the invention.

A cross section of the third embodiment of the All Plastic Disposable Pump (APDP) can be seen in FIG. 8. One of the advantages of this pump is, that it is allows manufacturing all the pump parts by a plastic molding process.

As can be seen in FIG. 8, the pump of this embodiment is constructed from five parts: pump body 201, top cap 215, nozzle 202, seal-rod 222 with a seal head 203, all made of plastic, and compression spring 204, preferably made of stainless steel.

The pump body 201 can be divided into five sections which are; the top neck 216, the top flexible section 217, seal base 210, bottom flexible section 220, and bottom neck 221. The pump is divided into two chambers, the upper chamber 223 and the lower chamber 224. The two chambers are connected via the opening 227 in the seal base 210 that is sealed by the seal head 203. The seal base 210 is pushed downward by the compression spring 204 on top of the seal head 203. The top cap 215 has at least one vertical through hole to allow the fluid from the collapsible bag (not shown) to flow into the upper chamber. The rigid seal rod 222 which passes through the opening 227 in the seal-base 210, is connected to the top cap 215 on one side and to the nozzle 202 on the other side. After the pump is assembled the top cap 215 and the nozzle 202 are fastened, typically by ultrasonically welding or gluing, to the top neck 216 and the bottom neck 221 respectively to form sealed joints at the top and the bottom.

Figure 9A:
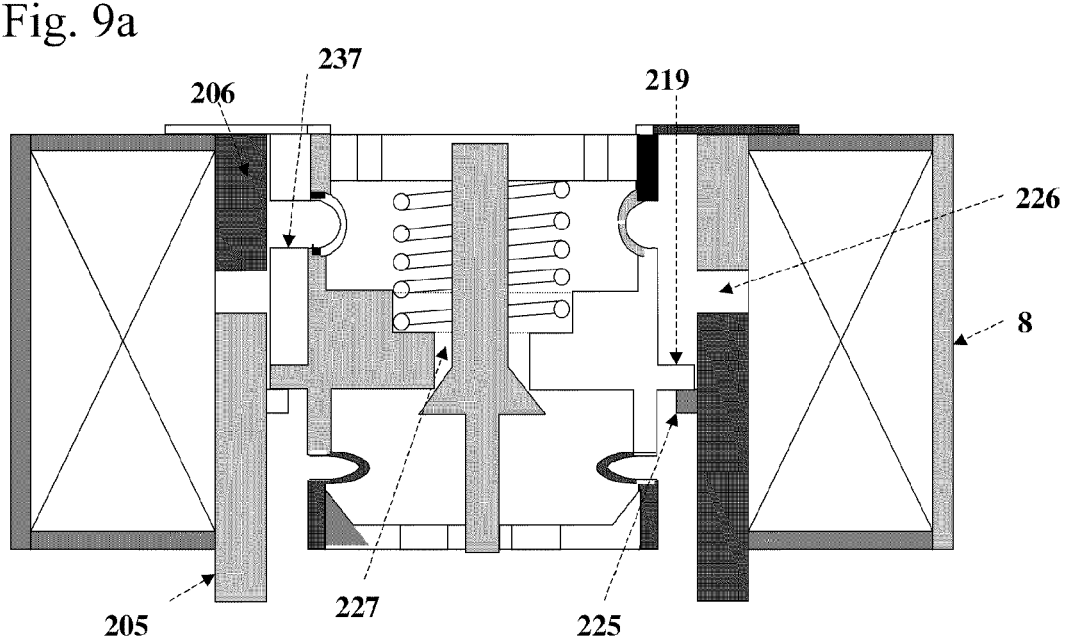
FIGS. 9a and 9b show a cross section of the embodiment of FIG. 8, inserted in a solenoid actuator.
Figure 9B:
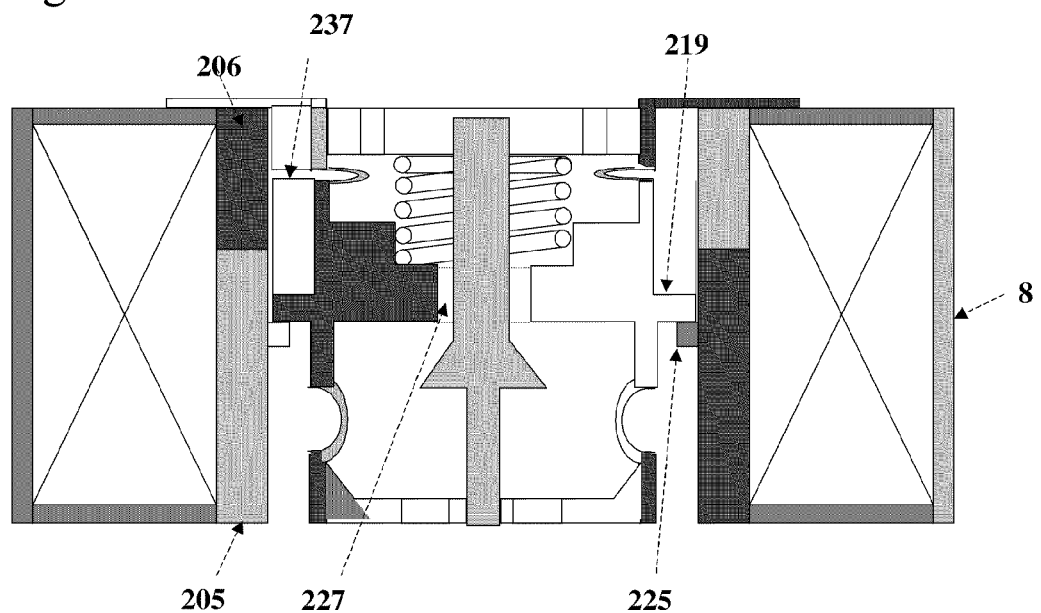

FIGS. 9a and 9b show the pump inserted in a solenoid 8 actuator. FIG. 9a shows the pump status when the solenoid 8 is not activated, and FIG. 9b shows the pump status when the solenoid 8 is activated. It will be understood that a collapsible bag (not shown) is connected to the top of the pump to form an integrated disposable bag pump.

The top part 216 of the pump is firmly held against the top part of solenoid 8, so it cannot move vertically when the solenoid 8 is actuated. Nozzle 202 is also rigidly connected to the top cap 215 by the seal rod 222, and cannot move vertically when the solenoid 8 is actuated. The coupling between the pump and the plunger 205, typically in the form of a ring or tabs 219, rests against the plunger 205 lifting ring or tabs 225 as can be seen in FIG. 9a.

Figure 13:
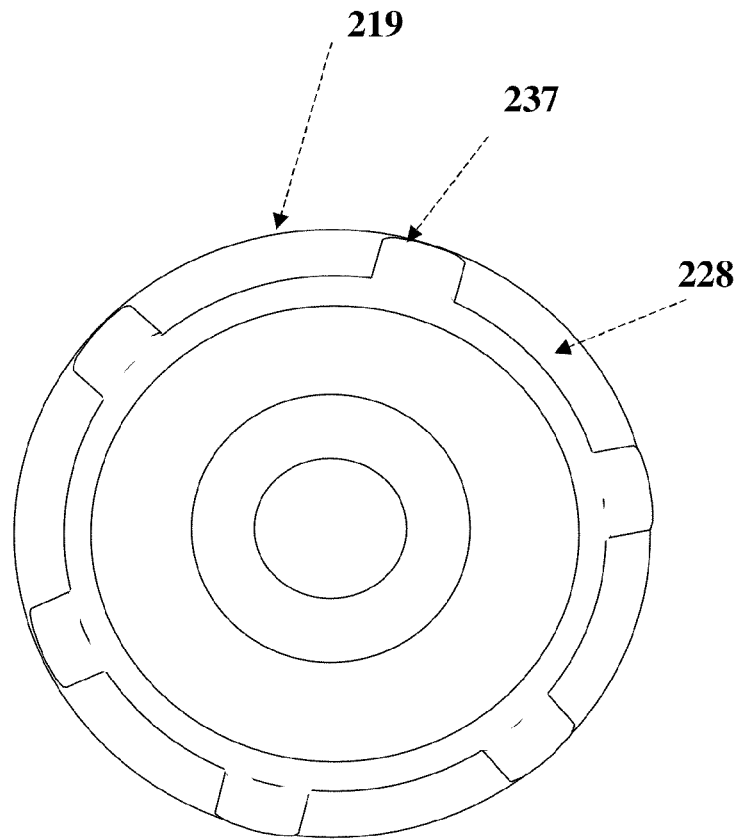
FIG. 13 shows a cut-through of FIG. 8, along the lines 13-13
Figure 9C:
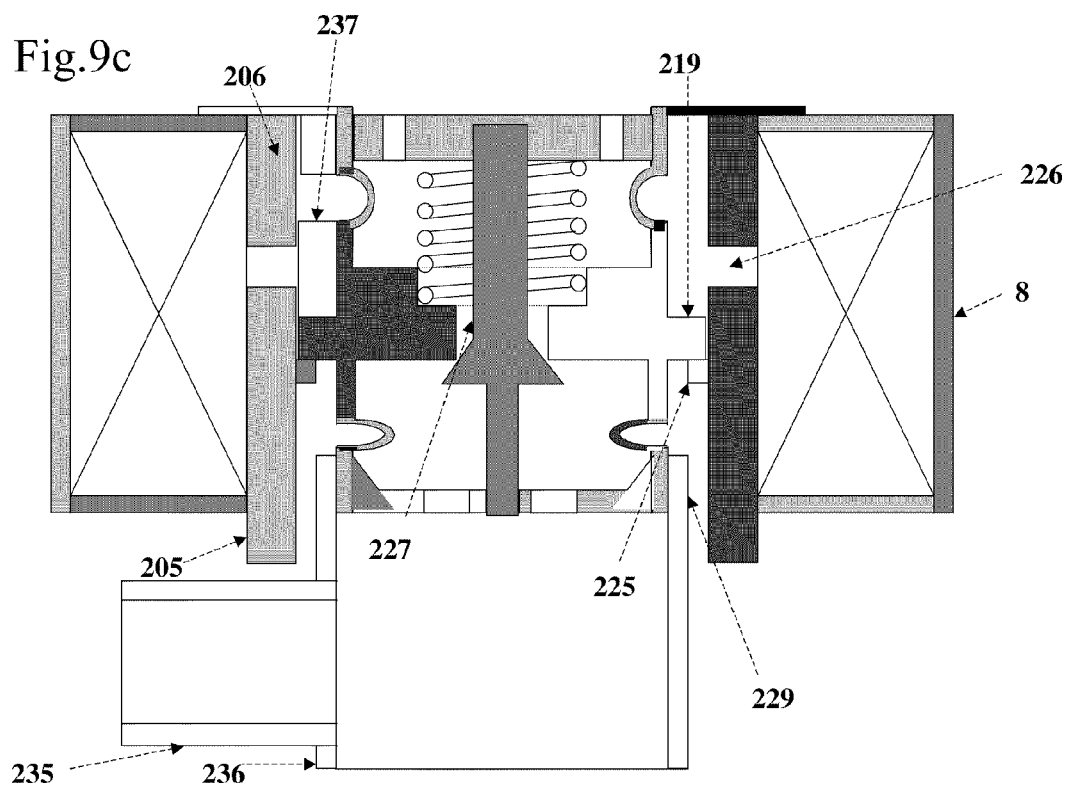
FIG. 9c shows a cross section of the embodiment of FIG. 8, inserted in a solenoid actuator, with a fluid mixer attachment.

In a case where tight fitting between the pump and the inner bore of the solenoid 8 is desired, or where the pump body needs to be made sturdier, a series of ribs 237, as can be seen in FIG. 8 and FIG. 13, are constructed along the top neck 216 and seal base 210 with open channels 228 between the adjacent ribs to allow for air flow between the pump and the solenoid when the pump is actuated. Typically, at the lower part a gap is left open between the upper arm 229 of the water junction 235 and the plunger 205 to allow a free movement of plunger 205, as can be seen in FIG. 9c.

When the pump is actuated, only the middle part of the pump body, between the upper bellows 217 and the bottom bellows 220 moves, since the top neck 216 is connected rigidly to the top of solenoid 8, and nozzle 202 is connected rigidly to the top cap 215 by the rigid seal rod 222. This is important for many different applications. For example; if the APDP is used in a beverage dispenser to dispense liquid concentrate, the bottom neck 221 can be fitted via a water seal fitting directly into the incoming water to dispense the concentrate directly into the water. In this application, the bottom neck 221 is inserted into the upper arm 229 of the T-shaped water fitting, the incoming water enters through the middle arm 235, and the beverage is dispensed through the lower arm 236 as can be seen in FIG. 9c.

Figure 14:
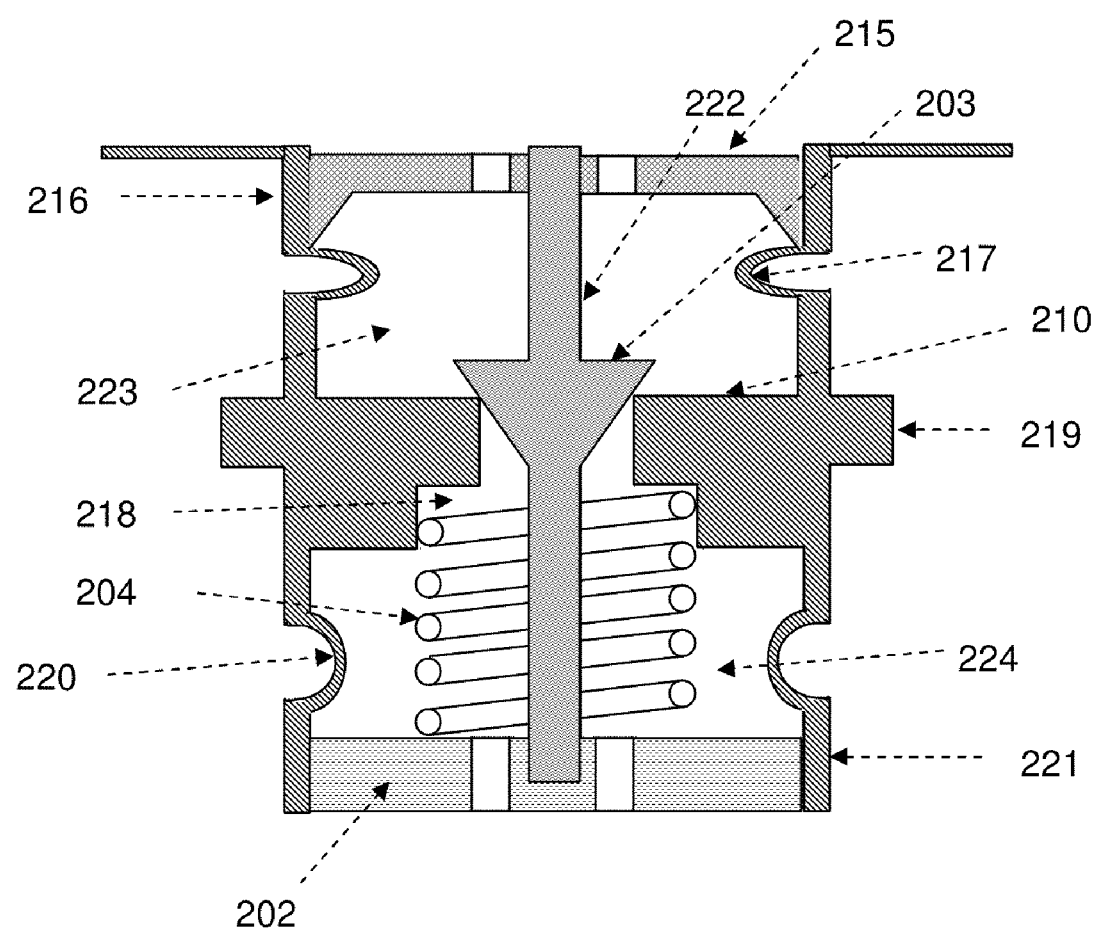
FIG. 14 shows a variation on the embodiment shown in FIG. 8, with the spring located in the lower chamber.

In FIG. 14 a second embodiment of the All Plastic Disposable Pump is shown. In this embodiment the spring 204 is positioned inside the bottom chamber 224 between the seal base 210 and the nozzle 202. In this embodiment the actuator (not shown) pushes the seal-base 210 downward and the spring 204 pushes the seal-base upward into the seal-head 203. This is in reverse to the actuation of the first embodiment of the All Plastic Disposable Pump as shown in FIGS. 9b and 9a, where the actuator pushes the seal-base 210 upward and the spring 204 pushes the seal-base 210 downward.

Figure 15:
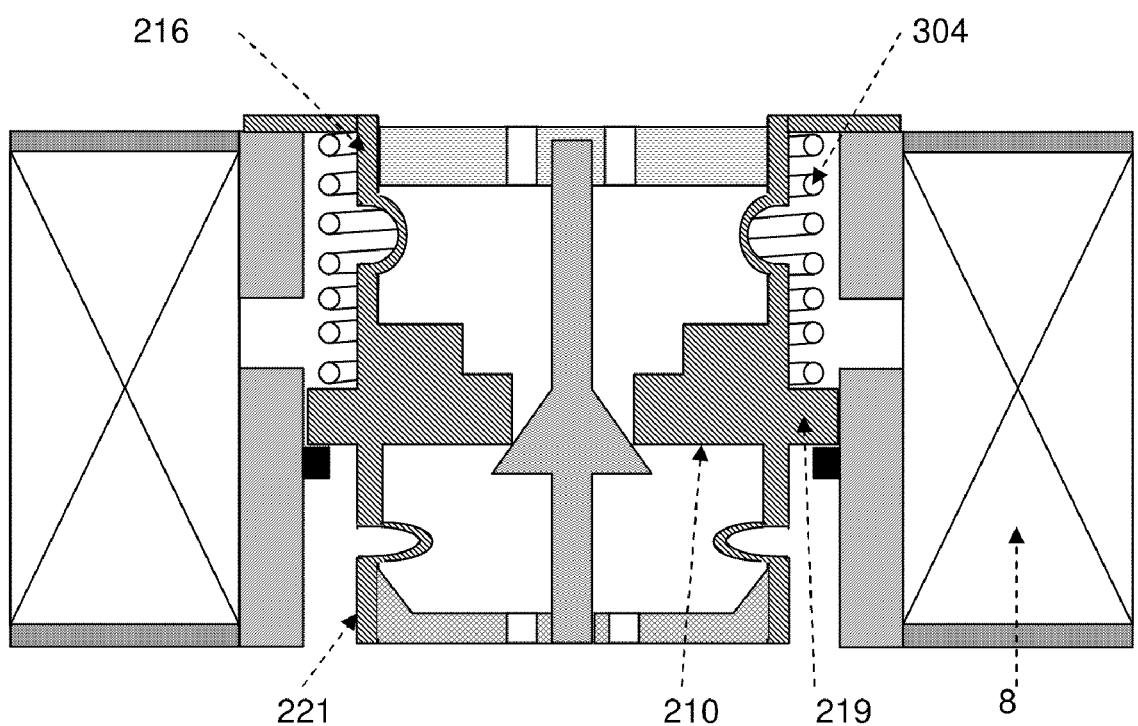
FIG. 15 shows a variation on the embodiment shown in FIG. 8, with the spring located outside the pump body.

In FIG. 15 a third embodiment of the All Plastic Disposable Pump is shown. In this embodiment the spring 304 is located outside of the pump body between the top-neck 216 and the seal-base 210 coupling means 219. It is also possible to place the spring 304 outside the pump body between the seal-base coupling means 219 and the lower neck 221.

As opposed to the embodiments shown in FIGS. 2 and 7, the All Plastic Disposable Pump does not require magnetic flux for actuation—it is only necessary to reciprocate the seal-base 210 up and down from a first position to a second position. Therefore the APDP can be also actuated by a pneumatic actuator or mechanical actuator within the teachings of the invention. In addition, since there are no inner moving parts, the All Plastic Disposable Pump of the invention can be used to dispense viscous fluids.

In the following we will refer to the solenoid actuator as shown FIGS. 9a and 9b, and use these figures to illustrate the pumping process. It will be understood that the same result can be achieved using pneumatic or mechanical actuator.

The All Plastic Disposable Pump Pumping Process

The top cap 215 is rigidly connected to the nozzle 202 by the rigid seal rod 222. Pump body 201 has two flexible sections: one 217 at the upper part of the pump and one 220 at the lower part as can be seen in FIG. 8.

As can be seen in FIG. 9a, when the solenoid 8 is not actuated, the compression spring 204, located in the upper chamber 223, expands the upper flexible section 217 and compresses the lower flexible section 220. This pushes seal base 210 downward against the seal head 203, isolating the upper chamber 223 from the lower chamber 224.

As shown in FIG. 9b, when the solenoid 8 is actuated by a voltage pulse, plunger 205 is pulled upward by the magnetic field to close the gap 226 between it and the pole piece 206. The seal-base 210, which is coupled to the plunger 205 via rings or tabs 219 and 225, is pushed upward a distance equal to the opening of gap 226 and upper flexible section 217 is compressed, lower flexible section 220 is expanded and spring 204 is compressed. When the seal base 210 is pushed upward, the upper chamber 223 volume is compressed while the volume of the lower chamber 224 is expanded, and the seal between the upper chamber 223 and the lower chamber 224 opens. Therefore the liquid from the upper chamber will be forced by the moving seal base 210 upward to flow from the compressed upper chamber 223 into the expanding volume of the lower chamber 224 through the now open seal. Because of the cone shape of the seal head 203, as the seal base 210 moves upward, the opening 227 between the upper chamber 223 and the lower chamber 224 increases in size and the resistance to the fluid flow through the seal opening from the upper chamber 223 to the lower chamber 224 decreases.

When the actuating voltage pulse goes to zero (that is, the solenoid 8 is deactivated), the now compressed spring 204 will push the seal base 210 back to its starting position until the moving seal base 210 is stopped by the seal head 203. When the seal base 210 is moving downward, the upper chamber 223 volume expands and the lower chamber 224 volume compresses. At the same time, the upper flexible section 217 expands and the lower flexible section 220 compresses. When the seal base 210 is moving upward, the upper chamber 223 volume compresses and the lower chamber 224 volume expands. At the same time, the upper flexible section 217 compresses and the lower flexible section 220 expands.

During the Dispensing Period, when the lower chamber is compressed, most of the liquid volume that entered the lower chamber 224 during the time when the seal base 210 was pushed upward and the lower chamber expended will be forced out through the nozzle 202 holes. A fraction of the liquid might flow back into the upper chamber 223. The ratio between the amount of liquid that will be dispensed to the amount that will be flowing back to the upper chamber 223 depends on the ratio of the integrated liquid conductivity of the nozzle 202 holes to the liquid conductivity of the opening 227 between the upper chamber 223 and the lower chamber 224. Also, as the seal base 210 is moving down the liquid conductivity of the opening 227 between the upper 223 and the lower 224 chambers is decreasing very rapidly while the liquid conductivity of the nozzle 202 holes stays the same.

By designing the total volume change of the lower chamber 224 during the dispense period and the ratio of the total nozzle 202 conductivity (i.e. the total number of holes and the diameter of the holes) to the total integrated conductivity of opening 227, the total dispensed liquid volume per stroke can be determined.

During the dispensing period when the upper chamber 223 is expanding and lower chamber 224 is compressing, the increasing volume of the upper chamber 223 will be refilled by the liquid drawn in from the collapsible bag (not shown) through the openings in top cap 215 by the suction effect of the expanding volume of the upper chamber 223. A small amount of liquid might flow back from the lower chamber 224.

The time interval between successive strokes should be equal or greater to the dispensing period time, to ensure that the liquid quantity dispensed per stroke will be the same.

In applications where quiet operation is desired, a few different methods of operation can be chosen:
A) a pneumatic or mechanical actuator can be used in place of the electric solenoid coil 8 and plunger 205.
B) the solenoid 8, the plunger 205, and the pole piece 206 can be designed similar to the one explained above for the Super Quiet Pump, where the plunger 205 diameter is smaller than the pole piece 206 diameter, so the plunger 205 is not stopped by the pole piece 206, but rather its velocity upward is brought to zero by the compression spring 204.

C) In order to damp noise generated when the plunger 205 is pushed down by the compression spring 204, a special damping absorber can be mounted at the bottom of the plunger 205.

The Integrated Disposable Bag Pump (IDBP) system, using any one of the three different embodiments of the Disposable Pump, can be used very efficiently in many different applications. A number of these applications will be described below to illustrate the wide range of possible applications of the invention in different fields of use.

Hot/Cold Beverage Dispensers

In hot or cold beverage dispensers where liquid concentrate is mixed with hot or cold water to dispense beverages, using the IDBP to store the concentrate liquid has many advantages as were described above.

Beverage Machine in Home Refrigerators

Figure 10:
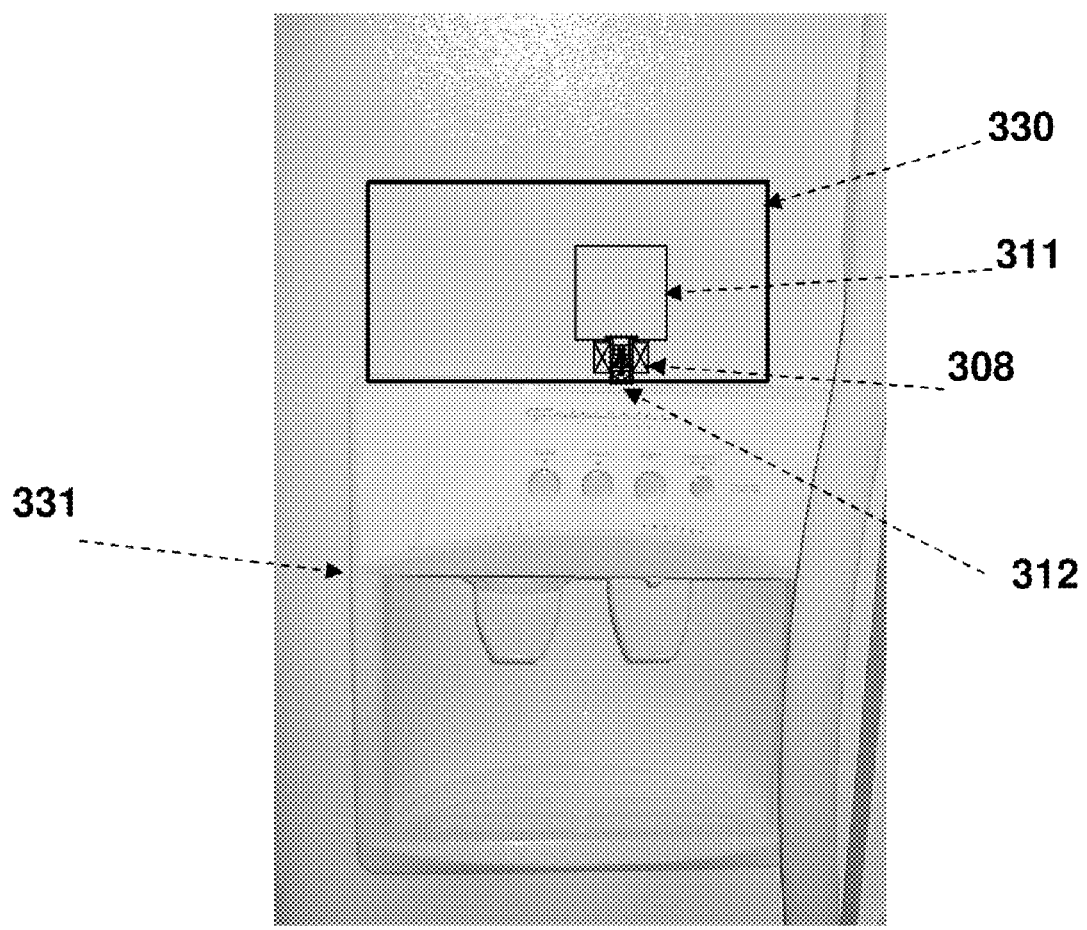
FIG. 10 shows a sketch of the invention mounted in a refrigerator door.

Many home refrigerators include the option of dispensing cold water or ice cubes through the refrigerator door. A dispenser incorporating the IDBP in the refrigerator or freezer door as can be seen in FIG. 10. The dispenser uses the available cold water to make cold beverage drinks which can include ice-coffee, ice-tea, and cold soft drinks. Adding a small chamber for a CO2 tank in the bottom of the freezer door enables us to provide carbonated soft drinks as well.

For the refrigerator dispenser all that is needed is a small solenoid 308 to actuate the pump 312 and a microcomputer based controller (not shown). The IDBP can be mounted on the freezer door in a "drop-door" 330 which will enable easy replacement of the empty IDBP. Since the water is supplied to the refrigerator from a city water source, using a simple constant flow restrictor provides the dispenser with cold water at constant flow rate which will simplify the concentrate liquid dispensing control.

Sanitation Industry

The IDBP technology can be used to automatically dispense liquid soap in public restrooms, hotels bathrooms, hospitals, doctor offices, and residential homes which will improve the sanitation and minimize the chance of transmitting diseases. The All Plastic Pump is especially suited for this application since it can dispense high viscous substances.

Figure 11:
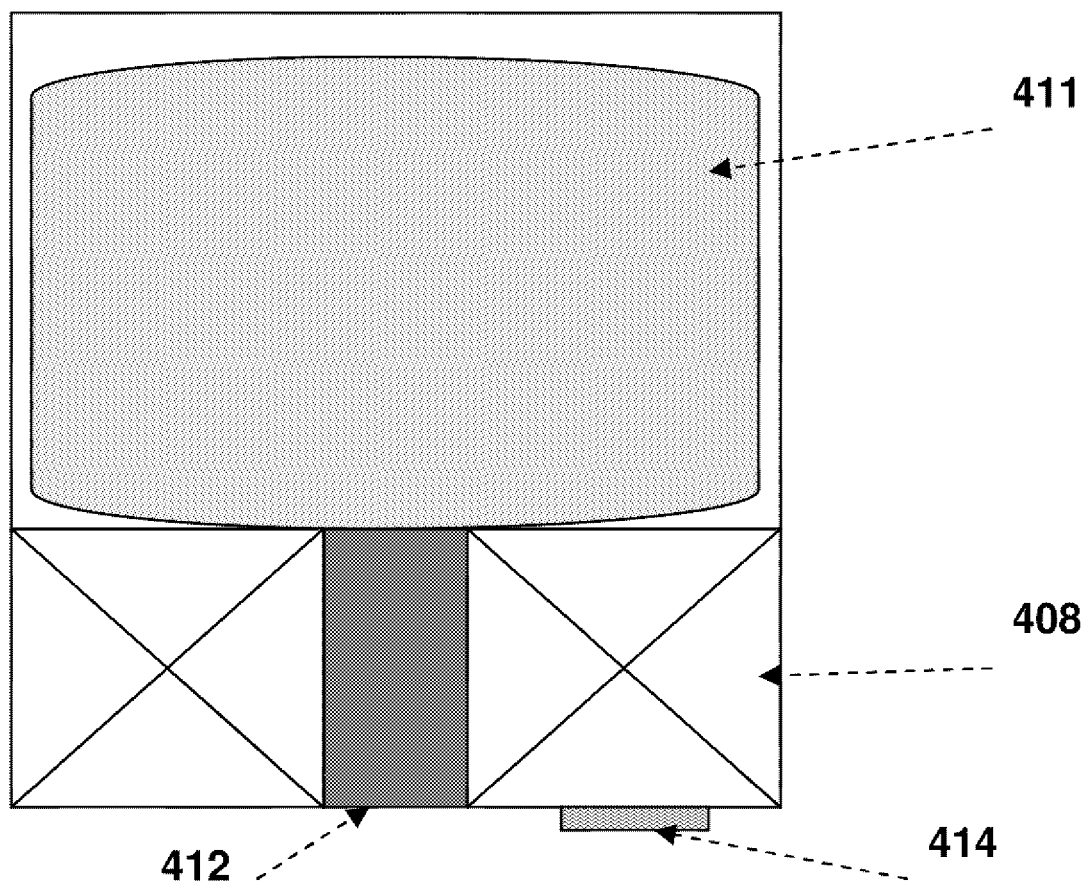
FIG. 11 shows a cross section of an embodiment of the invention, as used in a soap dispenser.

A schematic drawing of a soap dispenser using IDBP can be seen in FIG. 11. The soap dispensing is triggered automatically by a motion sensor 414. So when a user inserts his hand under the dispenser the motion sensor 414 will turn on the actuator 408 and the pump 412 will dispense small drops of soap every stroke. When the user will move his hand out from under the dispenser the motion sensor 414 will turn the dispenser off.

Chemical Process

The IDBP system can be used in chemical process where a very accurate quantity of two or more substances, in liquid form, has to be mixed automatically according to a preprogrammed profile for each substance.

Dispensing Corrosive Substance

The All Plastic Pump with the spring located outside the pump body is especially suited for these applications since no metallic parts will come in contact with the dispensed corrosive substance.

Manufacturing

Figure 12:
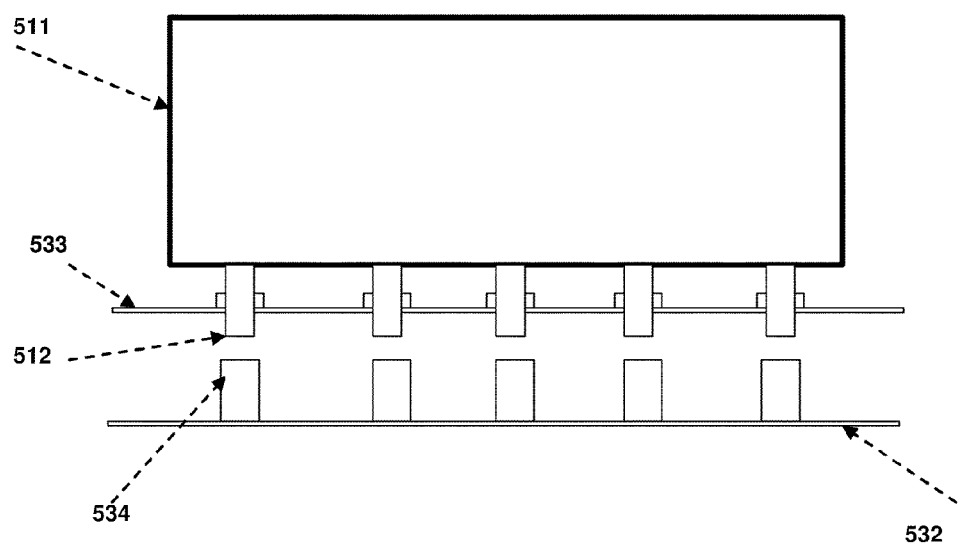
FIG. 12 shows a schematic representation of a number of the pumps of the invention, as they might be used in an assembly-line application.

In an automatic production line, a substances in liquid form may have to be mixed very accurately with a product 534 moving on a assembly line conveyer 532 as can be seen in FIG. 12. In order to increase the production rate per unit time, an embodiment of the All Plastic Disposable Pump (APDP) that does not require magnetic flux for dispensing can be used. An array of pumps 512 can be arranged in a row (or any other desired configuration) and connected to a single collapsible bag 511. The pumps 512 are spaced apart by the same distance as the product items 534 are spaced on the conveyer 532.

All the pumps 512 can be actuated be a single actuator 533 to simultaneously dispense into each one of the products 534 that are aligned with the pumps 512. In order to ensure continued operation, two IDBP dispensing systems can be mounted side by side and only one system arranged to dispense at a time. When the bag 511 in one system runs dry, the other system takes over. The operator can then replace the empty IDBP with a new one. This system has many advantages: it is very compact in size, has a very accurate dispensing rate, is simple to actuate and maintenance free, and it does not require any cleaning of the dispensing system.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A disposable pump for integration with a collapsible reservoir, comprising:
    a) a hollow pump body comprising:
        a first end connecting to the reservoir,
        a second end for dispensing liquid,
        a seal-base having a seal-base opening, located inside the pump body and dividing the pump body into a first section adjacent the first end and a second section adjacent the second end;
        a first flexible section formed in the first section; and
        a second flexible section formed in the second section;
        the seal-base being movable from a first position nearer the first end of the pump body to a second position nearer the second end of the pump body,
        wherein when the seal base is in the first position, the first flexible section is compressed, the first section is reduced in volume, the second flexible section is expanded and the second chamber is increased in volume, and when the seal base is in the second position, the second flexible section is compressed, the second section is reduced in volume, the first flexible section is expanded and the first chamber is increased in volume;
    b) a nozzle at the second end of the pump body;
    c) a top-cap at the first end of the pump body;
    d) a rigid seal-rod extending axially along the pump body from the top cap to the nozzle through the opening in the seal-base, having a seal-head sealing the opening in the seal-base by sealing against a side of the seal-base when the seal-base is in one of the first position or the second position, blocking flow of liquid through the opening in the seal-base;
    e) a compression spring, biasing the seal-base into one of the first position or the second position in which the seal-head seals the opening in the seal-base;

such that when the seal-base is reciprocally moved parallel to an axis of the pump body, the seal-base is moved between the first position and the second position.

2. The pump of claim 1 in which the pump body, top cap, nozzle, seal-rod and seal-head are made of molded plastic.

3. The pump of claim 1, in which the compression spring is made of non-magnetic metal 4. The pump of claim 1, further comprising:
a solenoid coil surrounding the pump body; and
a plunger slideably movable inside the solenoid coil and surrounding the pump body in contact with the body between the first section and the second section;
a pole piece inside the solenoid coil and surrounding the pump body, the pole piece being separated from the plunger by a gap;
such that when the solenoid coil is actuated, the plunger is drawn magnetically toward the pole piece, moving the seal-head from one of the first position or the second position to the other of the second position or the first position.

5. The pump of claim 1, further comprising a collapsible reservoir having an output coupled to the first end of the pump body.

6. The pump of claim 5, in which the collapsible reservoir is a bag-in-box.

7. The pump of claim 1, further comprising at least one rib on an outside surface of the pump body adjacent the seal-base.

8. The pump of claim 1, in which the compression spring is in the first section, between the seal base and the first end of the pump body, and biases the seal-base into the second position.

9. The pump of claim 1, in which the compression spring is in the second section, between the seal base and the second end of the pump body, and biases the seal-base into the first position.

10. The pump of claim 1, in which the compression spring is external to the pump body, coupled to the pump body adjacent to the seal base.

11. The pump of claim 10, in which the compression spring biases the seal-base into the first position.

12. The pump of claim 10, in which the compression spring biases the seal-base into the second position.

* * * * *